Oct. 1, 1963　　　　R. L. FOX　　　　3,105,317
FISH LURE

Filed Oct. 9, 1961　　　　2 Sheets-Sheet 1

Robert L. Fox
INVENTOR

BY *Robert J. Lainof*
ATTORNEY

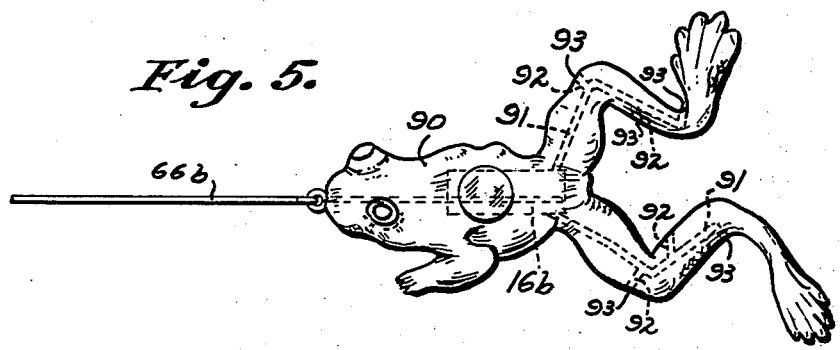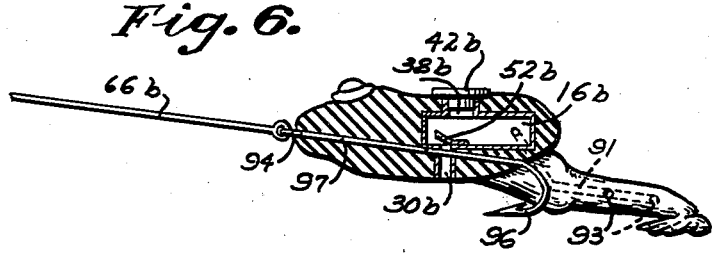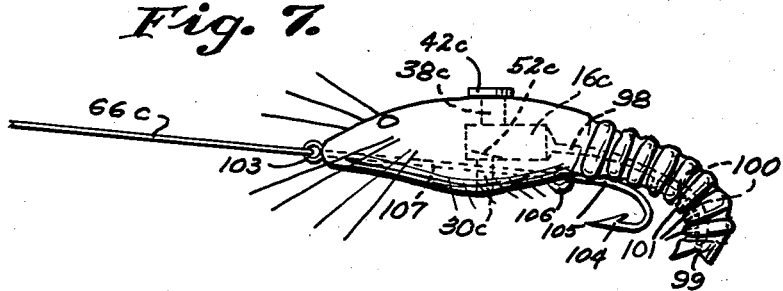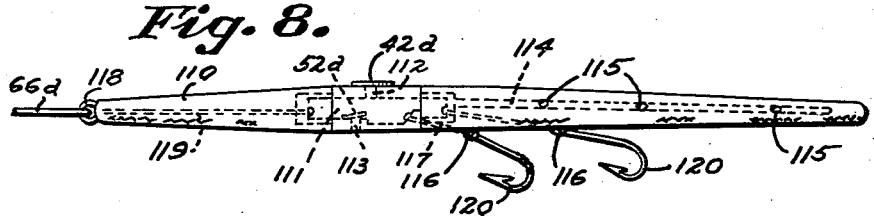

United States Patent Office 3,105,317
Patented Oct. 1, 1963

3,105,317
FISH LURE
Robert L. Fox, 512 Hilltop Terrace, Alexandria, Va.
Filed Oct. 9, 1961, Ser. No. 143,771
3 Claims. (Cl. 43—26.2)

This invention relates to a new and useful improvement in fish lures and more specifically to a fish lure provided with a gas producing chamber which will activate the arms of a fish lure.

An important object of the present invention is to provide a fish lure constructed with a hollow internal chamber to permit the deposit of a chemical tablet or crystal within the lure.

Another important object of this invention is to provide a fish lure whose appendages are moved as the lure is used in fishing.

Another important object of my invention is the provision of a fish lure with moving appendages and fish attracting sound when the lure is being used in fishing.

Another important object of my invention is the provision of a moving fish lure which can be cheaply constructed and which requires a minimum of moving parts.

Other features and advantages not specially enumerated will become apparent after a consideration of the following description and the appended claims. Reference being had to the accompanying drawings which form a part hereof, wherein like numerals refer to like parts throughout and in which:

FIGURE 5 is a top plan view of another fish lure of my invention constructed in the shape of a frog;

FIGURE 6 is a side sectional view of the modification shown in FIGURE 5;

FIGURE 7 is a side elevational view of another modification of my invention in the form of a shrimp; and FIGURE 8 is a side elevational view of another form of my invention constructed in the shape of a worm.

Figure 1:
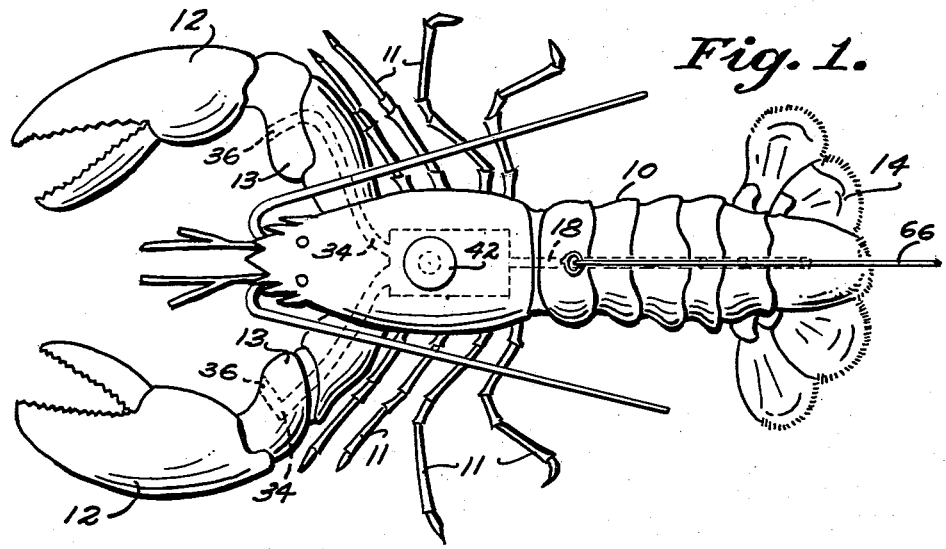
FIGURE 1 is a top plan view of a fish lure of my invention made in the form of a crayfish.

Referring now to the drawings in detail, wherein for purposes of illustration, there have been disclosed the preferred embodiments of this present invention. The numeral 10 refers to an elongated body formed in the shape of a crayfish. The crayfish is formed of a soft pliable material such as soft plastic or rubber. The elongated body 10 is provided at its front end with the feelers 11—11 as is usual with crayfish. Forwardly of the feelers 11—11 are the front claws 12—12. The claws 12 are connected to the front body of the crayfish by means of the arms 13. The tail 14 of the crayfish is shaped from the same pliable material and forms the rear of the body.

The body member 10 is hollow and is provided at its forward portion with a chamber 16. Extending rearwardly from the chamber 16 is a duct 18. The duct is provided with passages 20, 22 and 21 spaced along the bottom of the rearward portion of the body and which terminate in outlets 26, 27 and 28 respectively, for a purpose to be described later.

A duct 30 extends from the chamber 16 to an outlet on the bottom of the body 10 below the chamber 16. A pair of ducts 34—34 extend from the chamber 16 through the forward portion of the crayfish body, one duct extending through each arm of the crayfish to an outlet 36 formed in said arm adjacent the crayfish claw.

A duct 38 extends upwardly from the chamber 16 and terminates on the upper part of the body 10 in an opening 40. A plastic button or other stopper 42 is provided to securely close the outlet 40.

The chamber 16 is formed in a generally rectangular configuration and provided with openings that communicate with the ducts 18, 30, 34 and 38. The opening 50 connecting the chamber 16 to the duct 30 is normally open, but it may be closed by a resilient member 52. The member 52 is attached to the floor of the chamber 16, by any suitable means such that the resilient member is forced into a position to prevent air or water from entering the chamber, by gas which is built up within the chamber as is explained hereinafter.

At the lower end of the crayfish, and arranged generally in the central section of the body 10, I provide a ring 60. A line 62 extends from the ring through the body of the crayfish in a rearward direction to a second ring 64 on the outer section of the crayfish body. The fishing line leader 66 is connected to the lure at the ring 64. A line or hook 68 connects the fishing hooks 70 to the lower ring 60.

Operation

As is believed obvious, the fisherman using the lure of my invention, will deposit a tablet or crystal T within the chamber 16 of the lure by inserting same through the duct 38. The tablet or crystal is of a chemical that will generate gas when mixed with water. The fisherman having attached his leader to the lure ring 64, with the hooks already attached to the ring 60, then casts the lure into the stream or body of water within which he will fish. As the lure comes in contact with the water, water will pass through the ducts 18, 30 and 34 from the openings in the body of the lure into the chamber 16. When the water enters chamber 16 and contacts the tablet T, gas will be generated to fill the chamber 16. As the gas is generated, and because of the pressure thus developed within the chamber, the resilient member 52 will be pushed against the opening so as to close off the duct. The build up of gas will then force the gas through the ducts 18 and 34. The gas escaping through the ducts will vibrate the appendages through which it extends and give the appearance of movement of the lure.

Obviously, water will not enter the chamber through the ducts while the gas is generated and the pressure in the chamber is high. However, when the gas generation falls off and the gas pressure drops, more water will then enter the chamber through ducts 18 and 34 to contact the remaining chemical T to once again begin the cycle of generating gas. The renewal of the generation of the gas will then build up the gas in the chamber to once again close off the opening 50 so that no more water will enter and the generated gas then escapes through the ducts 18 and 34.

Figure 2:
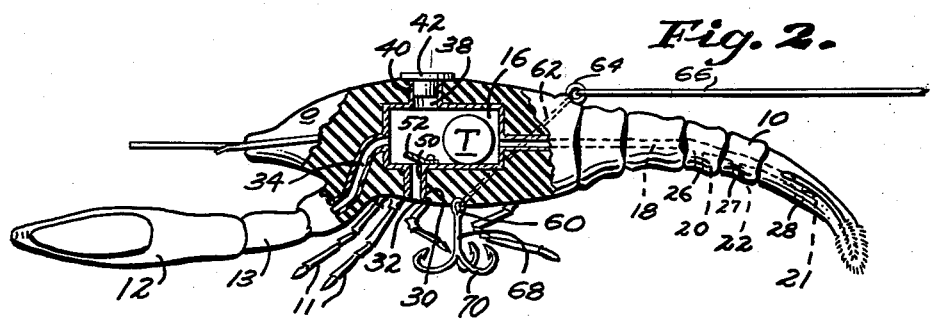
FIGURE 2 is a side elevational view, partly in section, of FIGURE 1.
Figure 3:
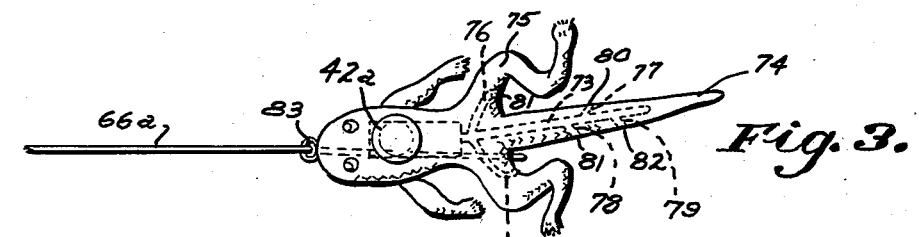
FIGURE 3 is a top plan view of another form of my invention constructed in the shape of a tadpole.

In FIGURE 3, I have shown my lure in the shape of a tadpole 75 provided with a chamber 16a. The duct 38a and duct 30a are provided and connected to the chamber similar to the arrangement shown in the lure of FIGURE 1 and FIGURE 2. The resilient member 52a being provided on the floor of the chamber 16a to close off the duct 30a on the build up of generated gas within such chamber. A button stopper 42a is utilized to seal off the duct 38a when the lure is in the water. A duct 73 extends from the chamber through the tail 74 of the tadpole 75. Passages 76 extend from the duct 73 adjacent its connection to the chamber to outlets 81. There being one outlet formed in each leg of the tadpole and one passage connected thereto. Passages 77, 78 and 79 extend from the duct 73 in the tail of the tadpole and terminate in the openings 80, 81 and 82 respectively, formed on the outer surface of the tail 74. A ring 83 is provided in the front of the tadpole where the mouth would be and a ring 84 is provided on the bottom of the tadpole approximately centrally thereof. A line 85 extends between the ring 83 and the ring 84. A fish hook 86 is connected to the ring 84 and a lead line 66a extends from the ring 83.

Figure 4:
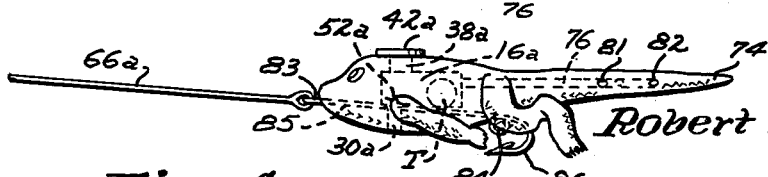
FIGURE 4 is a side elevational view of the lure shown in FIGURE 3.

The lure of the modification of my invention shown in FIGURES 3 and 4 is used in a similar manner to that of the invention shown in FIGURES 1 and 2. Since there are more passages, as at 78 and 79, on one side of tail 74 than on the opposite side, as at 77, the escaping gas will produce more thrust on one side than on the other side to thus effect a wiggling movement as the gas pressure builds up and falls off.

In FIGURES 5 and 6 I have shown the lure of my invention constructed in the form of a frog 90. Frog 90 is provided with the hollow chamber 16b. A duct 91 in communication with the chamber 16b extends rearwardly and centrally through each of the legs of the frog 90. Passages 92 are provided in the legs and extend from each duct to outlets 93 provided at spaced intervals on the outer surface of each leg. A button stopper 42b is provided to seal the duct 38b, and a resilient member 52b is arranged within the chamber 16b to cut off water from duct 30b. A ring 94 is provided in the front of the frog where the mouth would be, to which the hook 96 is connected by the hook arm 97. The leader 66b is attached by the fisherman to the ring 94. In this modification a line could be extended to another ring on the bottom of the lure, as shown in the FIGURES 1 and 2 and the modification of FIGURES 3 and 4.

In FIGURE 7, I have shown my invention in the form of a shrimp in which I have provided the hollow chamber 16c. A duct 38c is provided in communication with chamber 16c to extend from the chamber to the outer top portion of this lure of my invention. A duct 30c is also provided in communication with chamber 16c to extend to the bottom portion of this lure. A button stopper 42c is utilized to close off the duct 38c, and a resilient member 52c is provided within the chamber to close off the duct 30c. A duct 98 in communication with chamber 16c extends from the chamber through the tail of the shrimp and to an outlet 99 provided at the extremity of the shrimp. Passages 100 in communication with the duct 98 lead from the duct to outlets 101 provided at spaced intervals on the outer surface of the shrimp. A ring 103 is provided at the front of the shrimp where its mouth would be and a hook 104 is connected by means of its arm 105 to a ring 106 formed on the bottom central portion of the shrimp. A line 107 extends through the lower body of the shrimp to connect the rings 103 and 106. The fisherman attaches his lead line 66c to the ring 103 of this form of my invention.

In FIGURE 8, I have shown my fish lure invention in the form of a worm 110. Worm 110 is hollow and is provided with a chamber 111 centrally located therein. A duct 112 in communication with the chamber 111 extends upwardly from the chamber. A duct 113 in communication with the chamber 111 is positioned intermediate the ends of the chamber 111 on the opposite side of the chamber from duct 112. A duct 114 is formed in communication with chamber 111 and extends from the rear end of the chamber as seen in FIGURE 8 through the remainder of the body of the worm to a point adjacent its end. Passages 115 in communication with duct 114, extends from the duct to the outer surface of the worm body intermediate the right end of the worm, as seen in FIGURE 8, and the chamber 111. Rings 116 are attached to the chamber by means of lines or arms 117—117. A ring 118 is provided at the front end of the worm, as seen in FIGURE 8. The ring 118 is attached to the front end of chamber 111 by a line 119. A button stopper 42d is provided to close off the duct 112 and a resilient member 52d is utilized within the chamber 111 to close off the duct 113 in a manner similar to that of the resilient member 52 in FIGURES 1 and 2. The fisherman then attaches his lead line 66d to the ring 118.

*Operation*

As explained previously with respect to the form of my invention shown in FIGURES 1 and 2, the fisherman using either one of my lures will deposit a gas generating chemical within the chamber provided in the lure. He will then seal off the top duct with a button stopper or the like. Then with the hook and lines properly attached he will cast his lure in a normal fishing operation.

When the lure is cast or placed within the body of water, the water will enter the chamber within the lure and by reaction with the chemical in the tablet or crystal T generate a gas. The gas will build up in the chamber and close the bottom duct by forcing the resilient member against the opening communicating the chamber and duct. Gas generated will also be expelled through the other ducts in the lure and prevent water from entering the chamber through these ducts. The gas escaping from the ducts will move the appendages through which they travel to give the lure an appearance of life. Also, as the gas escapes, a noise will be created to attract fish to the lure.

When gas generation falls off, water will again be permitted to enter the chamber through the main ducts to start the cycle over again.

In the FIGURES 3 and 4 modification of my invention it is seen that the fisherman after having attached his lead line to the lure and having placed his tablet or gas producing element T, casts the lure into the body of the water and after gas has generated it escapes through the ducts 73 and 76 to activate the tadpole in a manner similar to the normal gyrations of a real tadpole to thus cause fish to be attracted to it.

The frog, shrimp and worm of my invention will also, by the placement of the ducts and the passages leading to outlets, in proper locations, cause the lures to react in a normal manner, insofar as its movement is concerned, for the attraction of fish.

Numerous modifications and variations of my present invention will occur to those skilled in the art after a careful study of the invention which I have here disclosed. For example, it is believed obvious that the ducts provided in each of the lures can be placed in any selected location to obtain a desired movement of the lure. It is also believed obvious that the attachment of hooks to the lures can be at other selected places. It is believed further obvious that the chamber of the lure can be constructed either of round or square shape or other configuration, instead of the rectangular shaping set forth in the application without departing from the intent and scope of this invention.

It is also believed obvious that the gas generating cycle will be used to produce sound as well as movement in the intended operation of my lures.

All such modifications and variations which come within the spirit and scope of the present invention are intended to be included herein as fully and completely as if they had been specifically illustrated, described and claimed herein.

Obviously the lure of my invention can be constructed from any suitable material and provided with the necessary passages, ducts and chambers necessary to obtain the result desired by my invention. The body of the lure may be colored and painted to form an attractive lure, or the material used can be pre-colored to provide the necessary attractiveness and coloring for my lures.

The exact construction and relative positioning of the various parts of this invention is by way of example and may be modified substantially within the scope and spirit of my invention without departing therefrom.

Having thus described and disclosed my invention, what is claimed as new is:

1. A fish lure of the character described comprising an elongated pliable body having at least one flexible appendage, a chamber formed within said body and adapted to receive a chemical tablet therein; one duct connected to said chamber in direct communication therewith and extending to an outlet provided on the outer surface of said body, a second duct connected to said chamber in direct communication therewith and extending to a second outlet provided on the outer surface of said body, and a third duct connected to said chamber in direct communication therewith and extending into an appendage of said body, a stopper mounted in said first mentioned duct for closing said outlet in communication therewith, a plurality of smaller passages connected to said third duct in communication therewith and extending to outlets provided on the outer surface of said appendage, fish hook means connected to said body, there being more of said smaller passages on one side of said appendage than on the opposite other side of said appendage to thus effect a wiggling movement of said appendage.

2. A fish lure of the character described comprising an elongated pliable body having at least one flexible appendage, a chamber formed within said body and adapted to receive a chemical tablet therein; one duct connected to said chamber in direct communication therewith and extending to an outlet provided on the outer surface of said body, a second duct connected to said chamber in direct communication therewith and extending to a second outlet provided on the outer surface of said body, and a third duct connected to said chamber in direct communication therewith and extending into an appendage of said body, a stopper mounted in said first mentioned duct for closing said outlet in communication therewith, a resilient member connected to said chamber and adapted to close off said second duct at selected intervals, a plurality of smaller passages connected to said third duct communication therewith and extending to outlets provided on the outer surface of appendage, fish hook means connected to said body, there being more of said smaller passages on one side of said appendage than on the opposite other side of said appendage to thus effect a wiggling movement of said appendage.

3. A fish lure of the character described comprising an elongated pliable body having a plurality of flexible appendages, a chamber formed within said body and adapted to receive a chemical tablet therein; one duct connected to said chamber in direct communication therewith and extending to an outlet provided on the outer surface of said body, a second duct connected to said chamber in direct communication therewith and extending to a second outlet provided on the outer surface of said body, a third duct connected to said chamber in direct communication therewith and extending into each appendage of said body, a stopper mounted in said first mentioned duct for closing said outlet in communication therewith, a plurality of smaller passages connected to said third duct in communication therewith and extending to outlets provided on the outer surfaces of said appendages, fish hook means connected to said body, there being more of said smaller passages on one side of each of said appendages than on the opposite other side of each of said appendages to thus effect a wiggling movement of said associated appendages.

References Cited in the file of this patent

UNITED STATES PATENTS

| | | |
|---|---|---|
| 2,256,813 | Mikina | Sept. 23, 1941 |
| 2,320,145 | LaDue | May 25, 1943 |
| 2,415,742 | Hiltabidel et al. | Feb. 11, 1947 |
| 2,854,776 | Van Sant | Oct. 7, 1958 |
| 2,932,916 | Strickland | Apr. 19, 1960 |

OTHER REFERENCES

Wall Street Journal, April 6, 1961.